United States Patent [19]

Switalski et al.

[11] Patent Number: 5,042,618
[45] Date of Patent: Aug. 27, 1991

[54] LIQUID/GAS DELIVERY SYSTEM

[75] Inventors: Daniel H. Switalski, Oconomowoc; David A. Roessler, Hartland, both of Wis.

[73] Assignee: Trico Mfg. Corp., Pewaukee, Wis.

[21] Appl. No.: 564,921

[22] Filed: Aug. 9, 1990

[51] Int. Cl.⁵ .............................................. F01M 1/00
[52] U.S. Cl. .................................. 184/6.26; 184/6.14; 184/55.1
[58] Field of Search ....................... 184/6.26, 7.4, 55.1, 184/55.2, 6.14, 29

[56] References Cited

U.S. PATENT DOCUMENTS

| | | | |
|---|---|---|---|
| 3,888,420 | 6/1975 | Boelkins | 184/7.4 |
| 4,345,668 | 8/1982 | Gaunt | 184/29 |
| 4,754,848 | 7/1988 | Azzopardi et al. | 184/6.26 |
| 4,759,427 | 7/1988 | Onose et al. | 184/6.26 |
| 4,785,913 | 11/1988 | Maurer et al. | 184/6.26 |

FOREIGN PATENT DOCUMENTS 0284866 10/1988 European Pat. Off. ........... 184/6.26

Primary Examiner—Ira S. Lazarus
Assistant Examiner—Alan B. Cariaso
Attorney, Agent, or Firm—Wheeler Law Firm

[57] ABSTRACT

The invention is a low volume lubricant delivery system for delivering low volumes of lubricant, entrained by gas, to workpieces and comprises essentially: a plurality of electrical conductors; a plurality of lubricant passages and a plurality of gas passages, preferably pipes; a compressor for supplying gas under pressure; a gas inlet; a gas outlet; gas flow control valves, one of which is a solenoid valve; a constant pressure pump; a lubricant entrainment structure, preferably a nozzle; a lubricant outlet; lubricant flow control valves, of which one is a solenoid valve; a lubricant supply and a timer. The lubricant supply being connected to the constant pressure pump by at least one lubricant pipe; the constant pressure pump means being connected to the lubricant flow control valves by at least one lubricant pipe and to the gas flow control valves by at least one gas pipe; the lubricant flow control valves being connected to the lubricant outlet by at least one lubricant pipe; the gas flow control device being connected to and between the gas inlet and the gas outlet by a gas passage; the gas inlet being connected by a gas passage to the gas supply; the timer being connected to the lubricant flow control valves by the power conductors; the timer generally controlling the operation of the lubricant flow control device so that the amount of lubricant delivered to the lubricant outlet is controlled; the lubricant entrainment nozzle comprising at least both the coolant outlet and the gas outlet; whereby the gas from the gas supply is delivered through the low volume lubricant delivery system to the gas outlet in the gas entrainment device and the lubricant from the lubricant supply is delivered through the low volume lubricant delivery system to the lubricant outlet in the gas entrainment device where the gas and the lubricant are discharged and the gas entrains the lubricant and delivers the lubricant to the workpiece.

3 Claims, 2 Drawing Sheets

LIQUID/GAS DELIVERY SYSTEM

BACKGROUND OF THE INVENTION

The device of this invention relates generally to the field of lubrication. Specifically the instant invention relates to an apparatus for applying low volumes of lubricants to machinery, primarily cutting tools, so that only an amount of lubricant sufficient to properly enhance the performance of the cutting tool is applied.

The main purpose of using a lubricant is to reduce friction. This is because friction increases wear on machinery. The most destructive product of friction is heat. The use of lubricants allows a machine operator to avoid heat damage to his machinery. For example, cutting tools may be used on a particular workpiece for a variety of operations. If no lubrication is used then friction between the cutting tool and the workpiece will normally produce a tremendous amount of heat that can result in damage not only to the cutting tool but also to the workpiece. Because of the ability of lubricants to reduce friction they are sometimes referred to as coolants.

Because the area between a cutting tool and workpiece is the only area where lubrication is necessary to reduce friction it is an objective of the instant invention to provide only enough lubricant to coat the portion of the cutting tool in contact with the workpiece. This eliminates waste of lubricant that can occur in other lubricating methods like flood lubrication.

In flood lubrication a relatively large volume of lubricant is applied to the cutting tool and workpiece. This results in lubricant that is not used between the cutting tool and the workpiece being wasted and also requires, when the workpiece is to undergo a subsequent finishing processes like anodizing or plating, that the workpiece be cleaned; usually with solvents. It is further required that excess liquid be collected, and either reused or disposed of in an approved manner. All of this creates costs which it is desirable to avoid.

Appropriately, it is another objective of the instant invention to apply lubricant in low volume amounts that are essentially consumed during the manufacturing process so that it is not necessary to clean the workpiece after the cutting tool has worked upon it. The reduction or elimination of a cleaning step in the manufacturing process has the advantage of eliminating or greatly reducing the need for solvents or other materials that may be required to prepare the workpiece for subsequent manufacturing processes and thus the need or cost of disposing of those materials can also be reduced or eliminated.

Still another objective of the instant invention is to create a system that can be filled at a much greater rate than the ultimate very small delivery rate, to avoid long set-up times and pre-filled delivery lines required by prior art systems.

Further, it is an objective of the instant invention to:

1. Provide a lubricant delivery system that is able to fill a new liquid delivery line with liquid in a short time by continuous operation of the pump and rapid opening and closing on the liquid solenoid valve.

2. Provide a lubricant delivery system that does not lose its prime when empty.

3. Provide a lubricant delivery system having flow restriction means in the delivery line of the device that can be quickly changed to give different flow delivery rates for the same timer setting or settings.

4. Deliver only an amount of lubricant sufficient to effectively lubricate a cutting tool so that it is not necessary to have to pre-wash the workpiece to remove excess lubricant before anodizing or plating.

5. Be able to engage with an outside controller to pump according to the start of operation of the machine tool or automatic machinery, or to use the limit switch of a machine tool.

The above objectives are fulfilled by the disclosed system.

The inventor knows of no prior art device or structure which has the same structure as the instant invention. U.S. Pat. No. 4,345,668 (Gaunt) discloses a low flow rate lubricating apparatus. However, the structure of Gaunt is not the structure of the instant invention. The Gaunt apparatus requires the use of pulses of air controlled by an "air logic unit". The instant invention does not have this structure. U.S. Pat. No. 3,888,420 (Boelkins), like Gaunt, requires that the liquid lubricant be applied by pulses of air supplied to cause the pump of Boelkins to operate through one stroke of the metering device with each pulse of air. The instant invention does not function this way nor does it have this structure. It is an objective of this invention to provide a lubricant delivery system in which the pump does not depend upon a pulsed air supply.

SUMMARY OF THE INVENTION

The invention is a low volume lubricant delivery system for delivering low volumes of lubricant, entrained by gas, to workpieces and comprises: a plurality of power conductor means, preferably electrical conductors; a plurality of lubricant passage means; a plurality of gas passage means; a gas supply means; a gas inlet means; a gas outlet; a gas flow control means; a constant pressure pump means; a lubricant entrainment means, preferably a nozzle; a lubricant outlet means; a lubricant flow control means; a lubricant supply means; a timer means; the lubricant supply means being connected to the constant pressure pump means by at least one lubricant passage means; the constant pressure pump means being connected to the lubricant flow control means by at least one lubricant passage means and to the gas flow control means by at least one gas passage means; the lubricant flow control means being connected to the lubricant outlet means by at least one lubricant passage means; the gas flow control means being connected to and between the gas inlet means and the gas outlet means by a gas passage means; the gas inlet means being connected by a gas passage means to the gas supply means; the timer means being connected to said lubricant flow control means by the power conductor means; the timer means generally controlling the operation of the lubricant flow control means so that the amount of lubricant delivered to the lubricant outlet means is controlled; the lubricant entrainment means comprising at least both the coolant outlet means and the gas outlet means; whereby the gas from the gas supply means is delivered through the low volume lubricant delivery system to the gas outlet means in the gas entrainment means and the lubricant from the lubricant supply means is delivered through the low volume lubricant delivery system to the lubricant outlet means in the gas entrainment means where the gas and the lubricant is discharged and the gas entrains the lubricant and delivers the lubricant to the workpiece.

The lubricant used is preferably a high quality lubricant having good cooling characteristics; other lubricants may be used. The invention applies very low volumes of lubricant to machines and cutting tools. The lubricant is applied by use of pressurized gas which entrains the lubricant. The resulting gas/lubricant mixture is then delivered to the point on the machine or workpiece desired.

The gas used in the invention is supplied constantly but at a pressure that may be controlled. There are no pulses of gas used to regulate the constant pressure pump means. Output of lubricant from the constant pressure pump is regulated by the output flow restriction means. The output flow control means is preferably at least one lubricant solenoid valve. The lubricant solenoid valve is connected to the timer so that when the timer is actuated it can operate the solenoid valve to control the output flow of lubricant; so that the flow of lubricant is intermittent. The output of lubricant is not regulated by pulses of air but by actuation of the timer to open or close the output flow control means to the flow of lubricant supplied from the constant pressure pump. Lubricant output is preferably further controlled by use of an output flow restriction valve, part of the lubricant output control means, that is placed in the lubricant output line after the solenoid valve. This flow restriction valve is preferably nonadjustable and designed to allow only a specific predetermined amount of lubricant through to the lubricant output means in a given time period at a given pressure. The amount of lubricant delivered through the flow restriction valve depends upon the gas pressure and the period of time the lubricant solenoid valve is open. The flow restriction valve can be exchanged with other flow restriction valves, independently of the pump output, to further regulate the amount of lubricant delivered. Thus the output is metered partly by the lubricant output control means and partly by the setting of the timer means and not at all by any metering action of the pump or by pulses of air.

A gas solenoid valve, one part of the gas flow control means controls the flow of gas to the mixing nozzle where the gas entrains the lubricant to carry it to the machine or workpiece. Preferably, an adjustable needle valve is also used to control the gas flow and to reduce the volume of air from the gas supply through the gas inlet that is directed toward the gas solenoid valve. The adjustable needle valve is especially helpful when the gas input means is a factory's compressor or some other device where the exact amount of airflow to the gas solenoid valve requires adjustment and the volume of air directed to the solenoid valve is large.

Preferably, the invention is used to apply lubricant or coolant to cutting tools, however, the invention may also be used to apply lubricant to moving machine parts like bearings.

These and other benefits of the present invention will be apparent to one skilled in the art from the following description.

DETAILED DESCRIPTION

Figure 2:
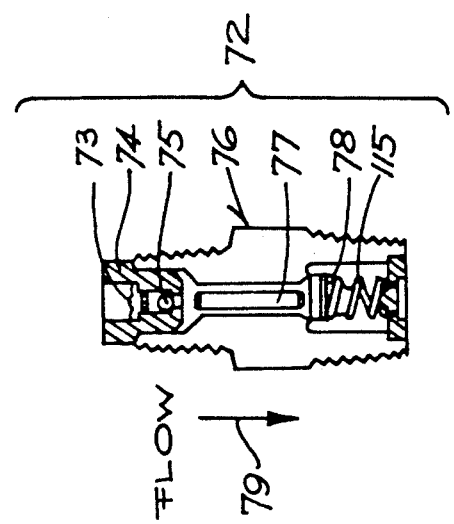
FIG. 2 is a cut away view of the flow restriction valve.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The liquid/gas delivery system shall be referred to as the unit 10 in this description. In its preferred form the unit 10 consists essentially of: a gas inlet 11, a lubricant outlet 12, a gas outlet 14, a gas supply 17, an interrupt/continuous flow switch 20, an on/off switch 30, a gas flow control unit 40, a constant pressure pump 50, a lubricant reservoir 60, a lubricant output flow control unit 70, and a timer unit 80.

Figure 1:
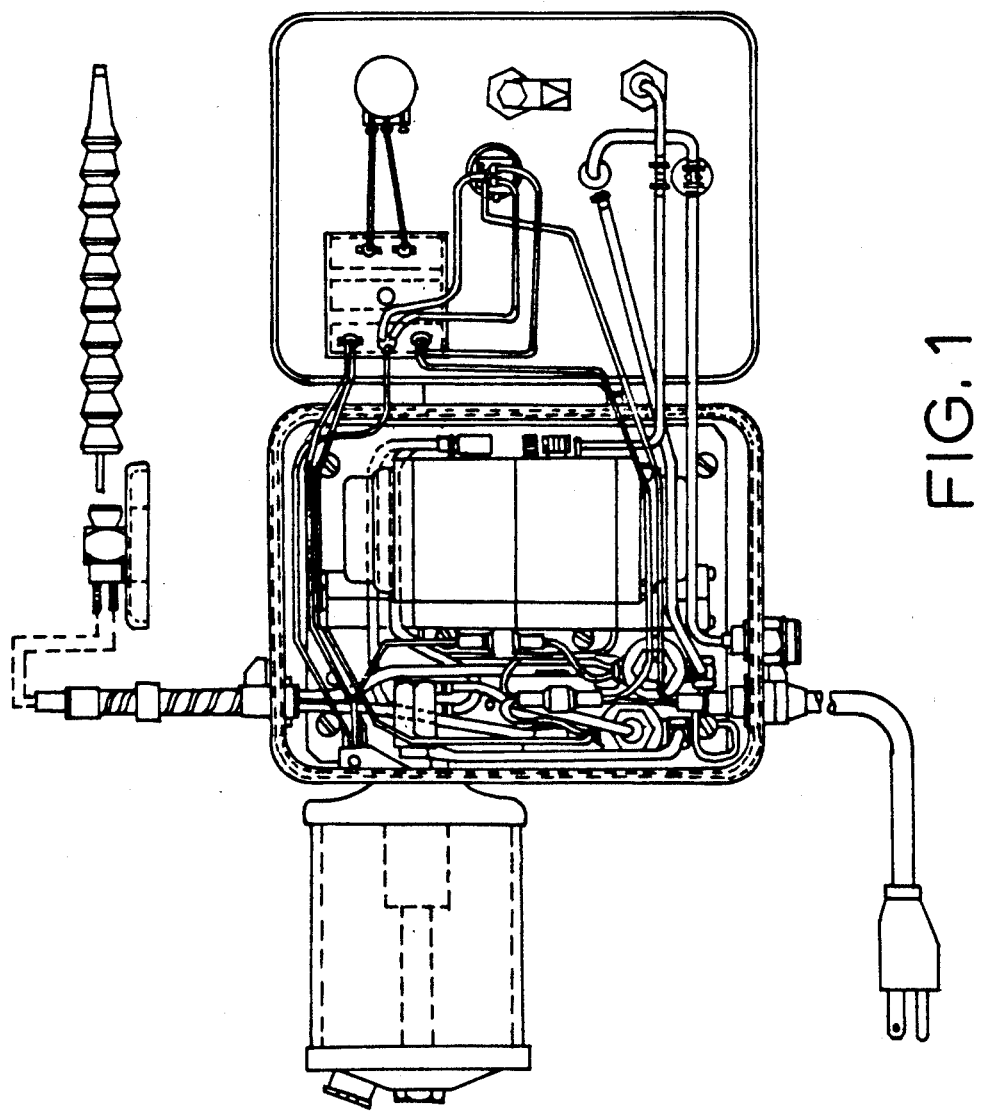
FIG. 1 is a side plan view of the liquid lubricant delivery unit.
Figure 3:
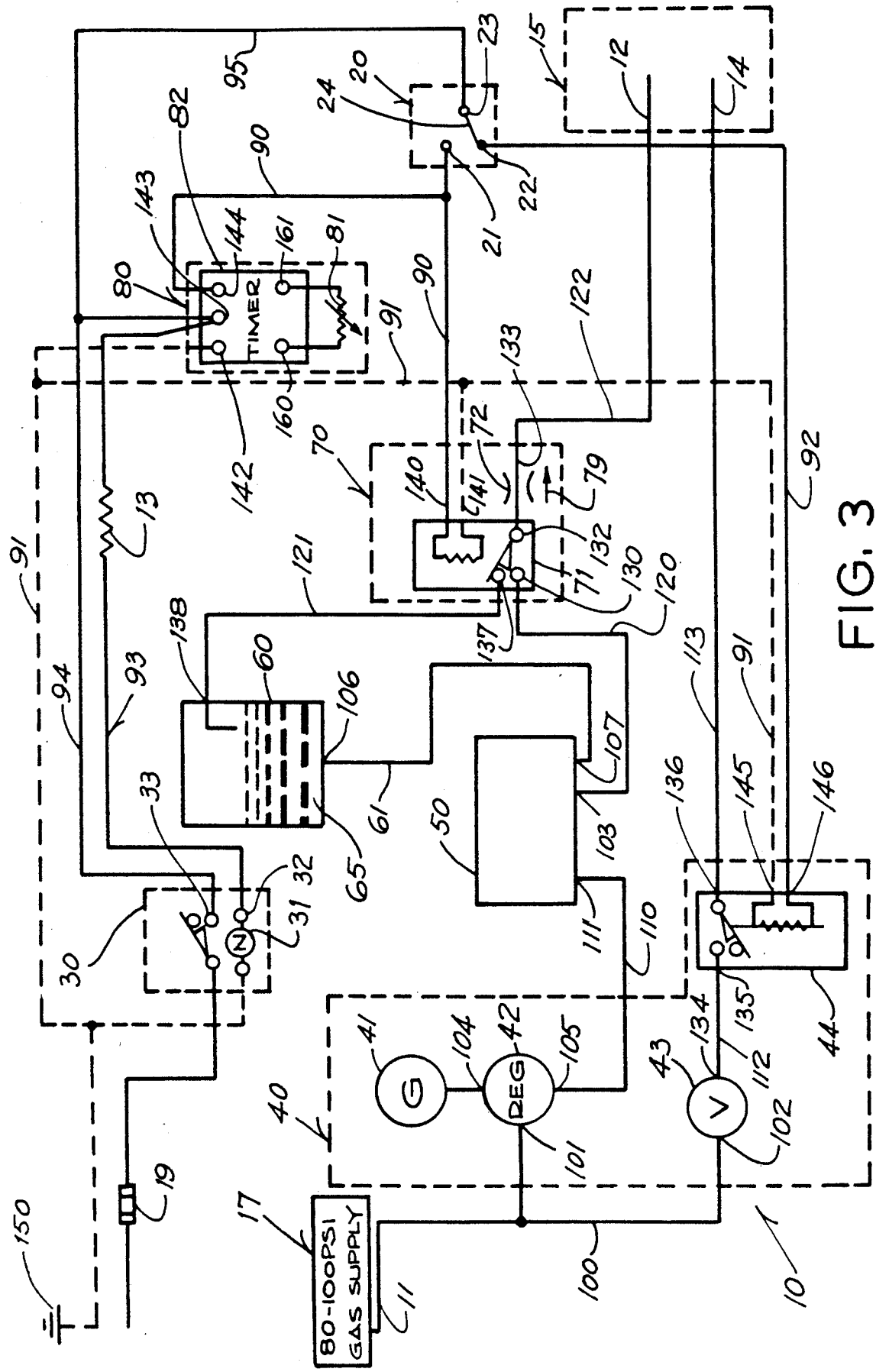
FIG. 3 is a schematic view of the liquid lubricant delivery system.

The timer unit 80 includes a potentiometer 81 attached to a timer 82 so that the potentiometer 81 may be used to adjust the timer 82 to produce intermittent signals at a pre-set adjustable rate which are applied to the output flow control unit 70 to open and close the output flow control unit 70 at predetermined intervals. By use of the interrupt/continuous flow switch 20 the intermittent signals of the timer 82 may also be applied to the gas flow control unit 40 so that the gas flow control unit 40 opens and closes in concert with the opening and closing of the output flow control unit 70. The gas flow control unit 40 comprises a gauge 41, a regulator 42, an adjustable needle valve 43, and a gas solenoid valve 44. The lubricant output flow control unit 70 comprises a lubricant solenoid valve 71 and a lubricant output flow restriction valve 72. The gas outlet 14 and the lubricant outlet 12 are contained in the nozzle 15. See FIG. 1; the nozzle 15 is also indicated by the box 15 in FIG. 3; any structure suitable may be used but the nozzle 15 is preferred.

The gas inlet 11 can be any conventional gas supply structure 17; e.g. a compressor or an air supply line designed to be attached to a compressor.

For purposes of this description the gas inlet 11 is merely an inlet for receiving gas from a conventional gas supply 17. The gas inlet 11 is connected to the regulator 42 and the adjustable needle valve 43 by gas pipe 100 at connections 101 and 102, respectively. See FIG. 3. The regulator 42 receives pressurized gas through connection 101. A gauge 41 is connected to the regulator 42 at connection 104. The gauge 41 reads the pressure of the gas that is flowing out of the regulator 42 through connection 105. Depending upon the flow required for the job to be done, the gas pressure leaving the regulator 42 is adjusted to be within the range of 20-80 pounds per square inch (psi). The adjustable needle valve 43 receives pressurized gas through gas pipe 100 at connection 102. The adjustable needle valve 43 is connected to the gas solenoid valve 44 by pipe 112. Pipe 112 is connected to the adjustable needle valve 43 at connection 134 and to the gas solenoid valve 44 at connection 135. The volume of gas supplied through the gas inlet 11 to the needle valve 43 may be adjusted so that the volume of gas passing through the needle valve 43 to the solenoid valve 44 is reduced. The use of both the needle valve 43 and the solenoid valve 44 improves control over both gas volume and pressure.

The solenoid valve 44 is connected to the gas outlet 14 by gas pipe 113. Gas pipe 113 is connected to the solenoid valve 44 at connection 136 and extends to the gas outlet 14. See FIG. 3. The rate at which gas is supplied to the gas outlet 14 is controlled by both the solenoid valve 44 and the needle valve 43. The needle valve 43 and the gas solenoid valve 44 may be adjusted independent of each other.

The regulator 42 is connected at connection 105 to gas pipe 110. Gas pipe 110 extends from the regulator 42 to the constant pressure pump 50 and is connected to the constant pressure pump 50 at inlet connection 111. The gas is constantly and continuously supplied to the pump 50 from the gas inlet means 11 through the regulator 42.

The constant pressure pump 50 is connected to the lubricant reservoir 60 by lubricant input pipe 61. The lubricant 65 is drawn from the lubricant reservoir 60 to the constant pressure pump 50 through the lubricant input pipe 61. The lubricant input pipe 61 is attached to the lubricant reservoir 60 at connection 106 and to the constant pressure pump 50 at connection 107.

The constant pressure pump 50 is connected to the lubricant outlet 12 through the lubricant output flow control unit 70 via lubricant pipes 120 and 122. Lubricant 65 is pumped at a constant pressure from the constant pressure pump 50 in the range of 20 psi to 80 psi through pipes 120, the lubricant output flow control unit 70, and pipe 122 to the lubricant outlet 12.

The constant pressure pump 50 is connected to the solenoid valve 71 by pipe 120. Pipe 120 is connected to the constant pressure pump 50 at connection 103 and to the solenoid valve 71 at connection 130. The restriction flow valve 72 is connected to the solenoid valve 71 at connection 132. The restriction flow valve 72 is connected to the lubricant outlet 12 by the pipe 122. The pipe 122 is attached to the restriction flow valve 72 at connection 133 and extends to the lubricant outlet 12.

The restriction flow valve 72 is a standard nonadjustable valve that, preferably, limits the rate at which lubricant 65 is supplied to the lubricant outlet 12 to a range of 0.05 ml/min. at 20 psi to 9 ml/min. at 80 psi; other restriction valves having greater or lesser rates of the lubricant 65 delivery may be used. The restriction flow valve 72 is a one way valve having a flow direction 79 and is comprised of an inlet filter screen 73, an inlet surge housing 74, a surge arrestor 75, a meter unit body 76, a flow meter pin 77, and a check valve 78 having a spring 115. See FIG. 2. The restriction valve 72 is activated by pressure coming from the direction 79 of the lubricant flow. When the solenoid valve 71 is opened, during operation of the unit 10, the lubricant 65 flows under pressure into the restriction valve 72 and is stopped until the pressure of the lubricant 65 is sufficient to overcome the holding force of the spring 115. When the pressure reaches the necessary level the spring 115 compresses and the check valve 78 opens allowing lubricant 65 through in the flow rate range given supra.

A lubricant vent and return pipe 121 is also attached to the solenoid valve 71. The pipe 121 extends from connection 137 on the solenoid valve 71 to connection 138 on the lubricant reservoir 60. The purpose of the lubricant vent and return pipe 121 is to prevent the build up of pressure within the solenoid valve 71 when the valve 71 is closed by directing any lubricant 65 that remains in the valve 71 back into the reservoir 60. This eliminates excessive lubricant from being delivered to the lubricant outlet 12. The employment of the vent and return pipe 121 is especially useful when a noncompressible lubricant, like a lubricating oil, is used.

The timer unit 80 actuates the solenoid valve 71 to vary the rate and flow of the lubricant 65 from the constant pressure pump 50 to the lubricant outlet 12. The timer unit 80 may also be used to actuate solenoid valve 44 to vary the rate and flow of the gas supplied to the gas outlet 14 by means of the intermittent/continuous flow switch 20. Both solenoid valves, 44 and 71, are normally closed. Only when energized will either solenoid valve 44 or 71 open.

The solenoid valve 71 is connected to the timer unit 80 by an electrical conductor 90. As noted supra, the timer unit 80 preferably consists of a timer 82 and a potentiometer 81. The timer 82 has five terminals 142-144 and 160-161. The solenoid valve 71 has two terminals 140 and 141. Terminal 141 of the solenoid valve 71 and terminal 142 of the timer 82 are connected to ground 150 via conductor 91. Conductor 90 is attached to the solenoid valve 71 at terminal 140 and to the timer 82 at terminal 144. Terminal 143 of the timer 82 is connected to terminal 33 of the on/off switch 30 via the conductor 94. When actuated the timer 82 sends out intermittent electric current through conductor 90 to the solenoid valve 71. This causes the solenoid valve 71 to open and close. The time that the timer 82 keeps the solenoid valve 71 open is varied by use of the potentiometer 81 within the range of 5 to 150 cycles (times) per minute. The potentiometer 81 is connected to the timer at terminals 160-161.

The timer 82, and thus solenoid valve 71, and solenoid valve 44 are actuated by the interrupt/continuous flow switch 20. The switch 20 is a single pole double throw switch having three terminals 21, 22, 23, and a toggle 24. The switch 20 has two positions: continuous and intermittent. Both solenoids, 71 and 44, are connected to the switch 20. The gas solenoid 44 has two terminals 145 and 146. Terminal 145 is connected to the ground 150 via the ground conductor 91. Terminal 146 is connected to terminal 22 of the switch 20 via conductor 92. Terminal 21 is connected between and to terminals 144 of the timer 82 and 140 of the lubricant solenoid valve 71 via conductor 90. Terminal 23 of the switch 20 is connected to terminal 143 of the timer 82 and to terminal 33 of the on/off switch 30 via conductors 95, and 94 respectively.

The invention functions as follows: A source of compressed gas is turned on to supply gas to the unit 10. The regulator 42 and the needle valve 43 are adjusted according to the level of gas pressure desired. The on/off switch 30 is switched to the on position, engaged with terminal 33, so power flows through switch 30 and conductors 93 and 94, that are attached to terminals 32 and 33, to the timer 82 and the switch 20. The neon light 31 indicates that the switch 30 is on when switch 30 is closed. The resistor 13 reduces the flow of current through conductor 93 to prevent the neon light 31 from being destroyed by excess current.

The switch 20 will be in one of its two positions; continuous or intermittent. The timer 82 is adjusted by the potentiometer 81 to energize the solenoid 71 to open at the required intervals causing lubricant to be delivered to the lubricant outlet 12 intermittently.

When the switch 20 is in the intermittent position connecting terminals 21 and 22 the timer 82 also energizes the solenoid valve 44 simultaneously with the solenoid valve 71 so that both valves 44 and 71 open and close in concert. Accordingly, gas is delivered to the gas outlet 14 in intervals that match the delivery of the lubricant 65, in intervals, from the solenoid valve 71.

When the switch 20 is in the continuous position connecting terminals 22 and 23 the function of the solenoid valve 71 remains as described supra but the solenoid valve 44 remains constantly open to deliver a continuous stream of gas to the gas outlet 14. One purpose of the continuous stream of gas is that sometimes machining of workpieces creates waste that impairs the path of the lubricant to the workpiece. By using a continuous stream of gas the waste is continually blown away from the workpiece and not just at the intervals where the lubricant 65 is applied. When the lubricant 65 is delivered to the lubricant delivery outlet 12 the gas from the gas outlet 14 entrains the lubricant 65 and delivers it to the desired machine tool or workpiece; lubricating the machine tool or workpiece while at the same time being of such a small amount that the workpiece need not be washed or cleaned before anodizing or other work is done to it.

The foregoing is considered as illustrative only of the principles of the invention. Furthermore, since numerous modifications and changes will readily occur to those skilled in the art, it is not desired to limit the invention to the exact construction and operation shown and described.

In the specification and the claims the term "passage" shall also mean rigid, semi-rigid, or flexible structures like and including pipes, conduits, or ducts; The term "gas" shall also mean a mixture or mixtures of gases; The term "workpiece" shall also mean the machine or portion of the machine that is doing work on the workpiece; The term "power" shall include electric power. All of the above stated terms shall be interpreted as having the above stated meanings in addition to their common or normal meanings.

What is claimed is:

1. A low volume gas/liquid delivery system for delivering low volumes of liquid, entrained by gas, to workpieces comprising:
    a plurality of power conducting means;
    a plurality of liquid passage means;
    a plurality of gas passage means;
    gas supply means;
    gas inlet means;
    gas outlet means;
    gas flow control means;
    constant pressure pump means;
    liquid entrainment means;
    liquid outlet means;
    liquid flow control means;
    liquid supply means;
    timer means;
    said liquid supply means being connected to said constant pressure pump means by at least one said liquid passage means of said plurality of liquid passage means;
    said constant pressure pump means being connected to said liquid flow control means by at least one said liquid passage means of said plurality of liquid passage means and to said gas flow control means by at least one said gas passage means of said plurality of gas passage means;
    said liquid flow control means being connected to said liquid outlet means by at least one said liquid passage means of said plurality of liquid passage means;
    said gas flow control means being connected to and between said gas inlet means and said gas outlet means by said gas passage means;
    said gas inlet means being connected by said gas passage means to said gas supply means;
    said timer means being connected to said liquid flow control means by said power conducting means;
    said timer means generally controlling the operation of said liquid flow control means so that the amount of liquid delivered to said liquid outlet means is controlled;
    said liquid entrainment means comprising said liquid outlet means and said gas outlet means;
    whereby said gas from said gas supply means is delivered through said low volume liquid delivery system to said gas outlet means in said gas entrainment means and said liquid from said liquid supply means is delivered through said low volume liquid delivery system to said liquid outlet means in said gas entrainment means where said gas and said liquid are discharged and said gas entrains said liquid and delivers said liquid to said workpiece.

2. A low volume gas/liquid delivery system for delivering low volumes of liquid, entrained by gas, to workpieces comprising:
    a plurality of power conducting means;
    a plurality of liquid passage means;
    a plurality of gas passage means;
    gas supply means;
    gas inlet means;
    gas outlet means;
    gas flow control means;
    constant pressure pump means;
    liquid entrainment means;
    liquid outlet means;
    liquid flow control means;
    liquid supply means;
    timer means;
    said liquid supply means being connected to said constant pressure pump means by at least one said liquid passage means of said plurality of liquid passage means;
    said constant pressure pump means being connected to said liquid flow control means by at least one said liquid passage means of said plurality of liquid passage means and to said gas flow control means by at least one said gas passage means;
    said liquid flow control means being connected to said liquid outlet means by at least one said liquid passage means of said plurality of liquid passage means;
    said gas flow control means being connected to and between said gas inlet means and said gas outlet means by said gas passage means;
    said gas inlet means being connected by said passage means to said gas supply means;
    said timer means being connected to said liquid flow control means and said gas flow control means by said power conducting means;
    said timer means generally controlling the operation of said liquid flow control means so that the amount of liquid delivered to said liquid outlet means is controlled;
    said timer means generally controlling the operation of said gas flow control means so that the amount of gas delivered to said gas outlet means is controlled to coincide with said delivery of said liquid to said liquid outlet;
    said liquid entrainment means comprising said lubricant outlet means and said gas outlet means;

whereby said gas from said gas supply means is delivered through said low volume liquid delivery system to said gas outlet means in said gas entrainment means and said liquid from said liquid supply means is delivered through said low volume liquid delivery system to said liquid outlet means in said gas entrainment means where said gas and said liquid are discharged and said gas entrains said liquid and delivers said liquid to said workpiece.

3. A low volume gas/lubricant delivery system for delivering low volumes of lubricant, entrained by gas, to workpieces comprising:
   a plurality of power conducting means;
   a plurality of lubricant passage means;
   a plurality of gas passage means;
   gas supply means;
   gas inlet means;
   gas outlet means;
   gas flow control means;
   constant pressure pump means;
   lubricant entrainment means;
   lubricant outlet means;
   lubricant flow control means;
   lubricant supply means;
   timer means;
   said lubricant supply means being connected to said constant pressure pump means by at least one said lubricant passage means;
   said constant pressure pump means being connected to said lubricant flow control means by at least one said lubricant passage means and to said gas flow control means by at least one said gas passage means;
   said lubricant flow control means being connected to said lubricant outlet means by at least one said lubricant passage means;
   said gas flow control means being connected to and between said gas inlet means and said gas outlet means by said gas passage means;
   said gas inlet means being connected by said gas passage means to said gas supply means;
   said timer means being connected to said lubricant flow control means by said power conducting means;
   said timer means generally controlling the operation of said lubricant flow control means so that the amount of lubricant delivered to said lubricant outlet means is controlled;
   said lubricant entrainment means comprising said lubricant outlet means and said gas outlet means;
   whereby said gas from said gas supply means is delivered through said low volume lubricant delivery system to said gas outlet means in said gas entrainment means and said lubricant from said lubricant supply means is delivered through said low volume lubricant delivery system to said lubricant outlet means in said gas entrainment means where said gas and said lubricant are discharged and said gas entrains said lubricant and delivers said lubricant to said workpiece.

* * * * *